United States Patent
Morgan et al.

(10) Patent No.: US 6,709,001 B1
(45) Date of Patent: Mar. 23, 2004

(54) COUPLING SYSTEM AND METHOD OF USE THEREOF

(75) Inventors: David William Morgan, Frome (GB); Nigel Edward Robinson, Yatton (GB)

(73) Assignee: One Contact Srl, Flefo (IT)

( * ) Notice: Subject to any disclaimer, the term of this patent is extended or adjusted under 35 U.S.C. 154(b) by 119 days.

(21) Appl. No.: 10/069,488

(22) PCT Filed: Oct. 17, 2001

(86) PCT No.: PCT/GB01/04626
§ 371 (c)(1),
(2), (4) Date: Feb. 22, 2002

(87) PCT Pub. No.: WO02/32744
PCT Pub. Date: Apr. 25, 2002

(30) Foreign Application Priority Data

Oct. 18, 2000 (GB) .............................................. 0025512

(51) Int. Cl.$^7$ .............................................. B62D 53/08
(52) U.S. Cl. ........................................ 280/421; 280/433
(58) Field of Search ................................. 280/433, 434, 280/420, 421, 438.1, 439, 422

(56) References Cited

U.S. PATENT DOCUMENTS

| | | | | |
|---|---|---|---|---|
| 2,888,275 A | * | 5/1959 | Hill | 280/420 |
| 3,127,194 A | | 3/1964 | Jeffries | |
| 3,181,888 A | * | 5/1965 | Boylan et al. | 280/421 |
| 3,653,686 A | * | 4/1972 | Roesies | 280/421 |
| 3,719,372 A | | 3/1973 | Rawlings | |
| 3,751,070 A | * | 8/1973 | Schaffart et al. | 280/432 |
| 3,815,937 A | | 6/1974 | Hodgson | |
| 3,888,513 A | | 6/1975 | Pilz et al. | |
| 3,941,408 A | | 3/1976 | Petersson | |
| 4,077,649 A | * | 3/1978 | Hawk | 280/420 |
| 5,060,964 A | * | 10/1991 | Vick | 280/421 |
| 5,861,802 A | | 1/1999 | Hungerink et al. | |
| 5,912,616 A | | 6/1999 | Valentino | |
| 6,213,489 B1 | * | 4/2001 | Eckelberry | 280/407.1 |

FOREIGN PATENT DOCUMENTS

| | | |
|---|---|---|
| DE | 196 33 544 A1 | 8/1996 |
| DE | 297 22 370 U1 | 12/1997 |
| EP | 0 816 211 A2 | 1/1998 |
| FR | 70.35238 | 9/1970 |
| FR | 2 338 175 | 1/1976 |

* cited by examiner

*Primary Examiner*—Avraham Lerner
(74) *Attorney, Agent, or Firm*—Higgs, Fletcher & Mack LLP; Charles F. Reidelbach, Jr.

(57) ABSTRACT

A coupling system for a vehicle such as an articulated lorry and method of use thereof is provided. The articulated lorry includes at least a tractor unit and a trailer unit. The tractor unit has first coupling means provided on a fifth wheel which engages with second coupling means typically in the form of a kingpin on the trailer unit. The fifth wheel coupling means and the kingpin have one or more pneumatic and/or electrical supply lines provided therein which engage upon mechanical engagement of the fifth wheel coupling means and kingpin, thereby allowing pneumatic and/or electrical supply between said tractor unit and said trailer unit and/or vice versa. One of the fifth wheel coupling means or kingpin is provided with one or more annular protrusions on a coupling surface and the other is provided with complementary annular channels on a coupling surface. The annular protrusions engage with the annular channels upon mechanical engagement of the tractor unit and trailer unit to affect the connection of at least one of said supply lines simultaneously to mechanical coupling of the tractor and trailer units.

34 Claims, 14 Drawing Sheets

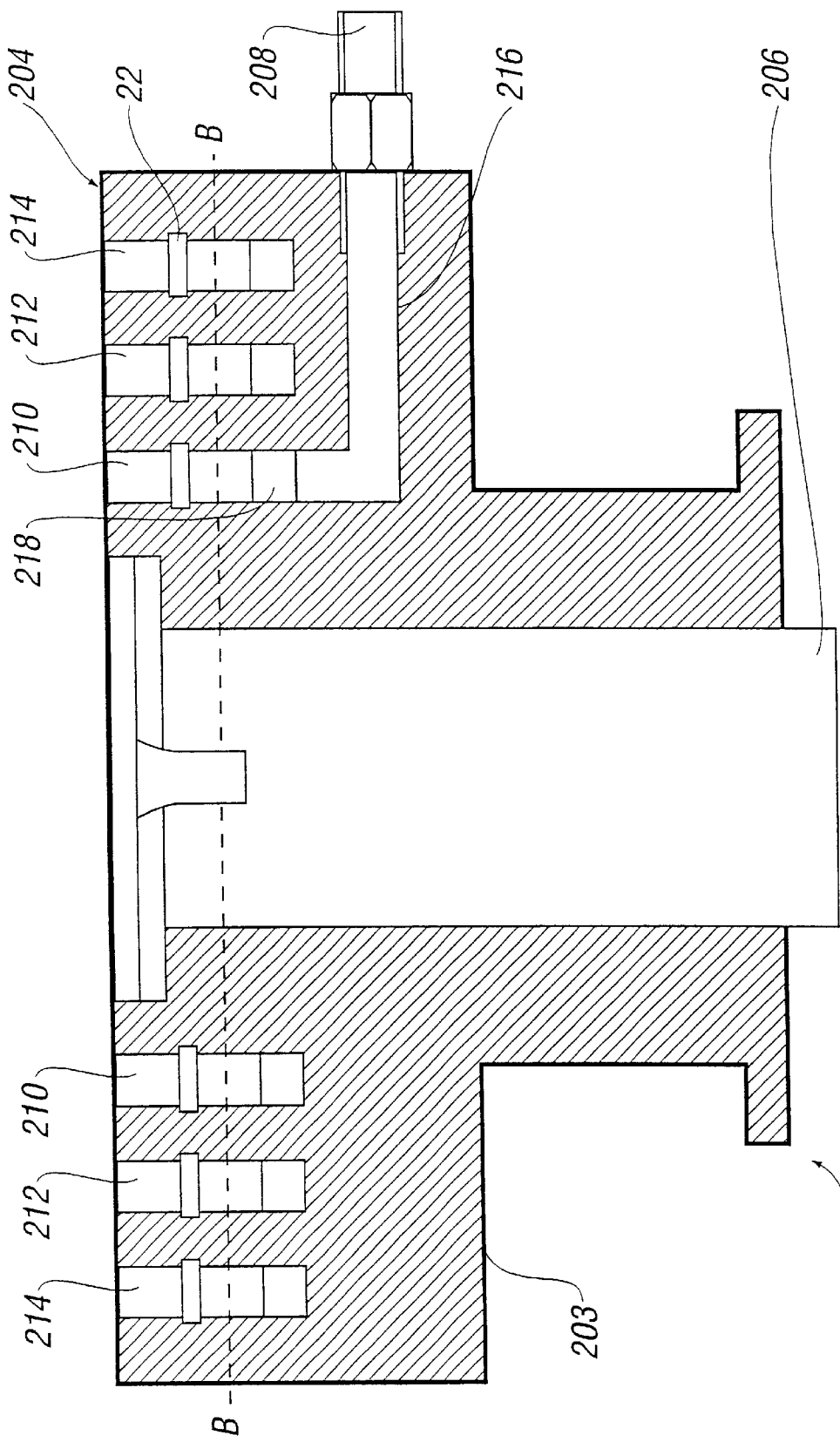

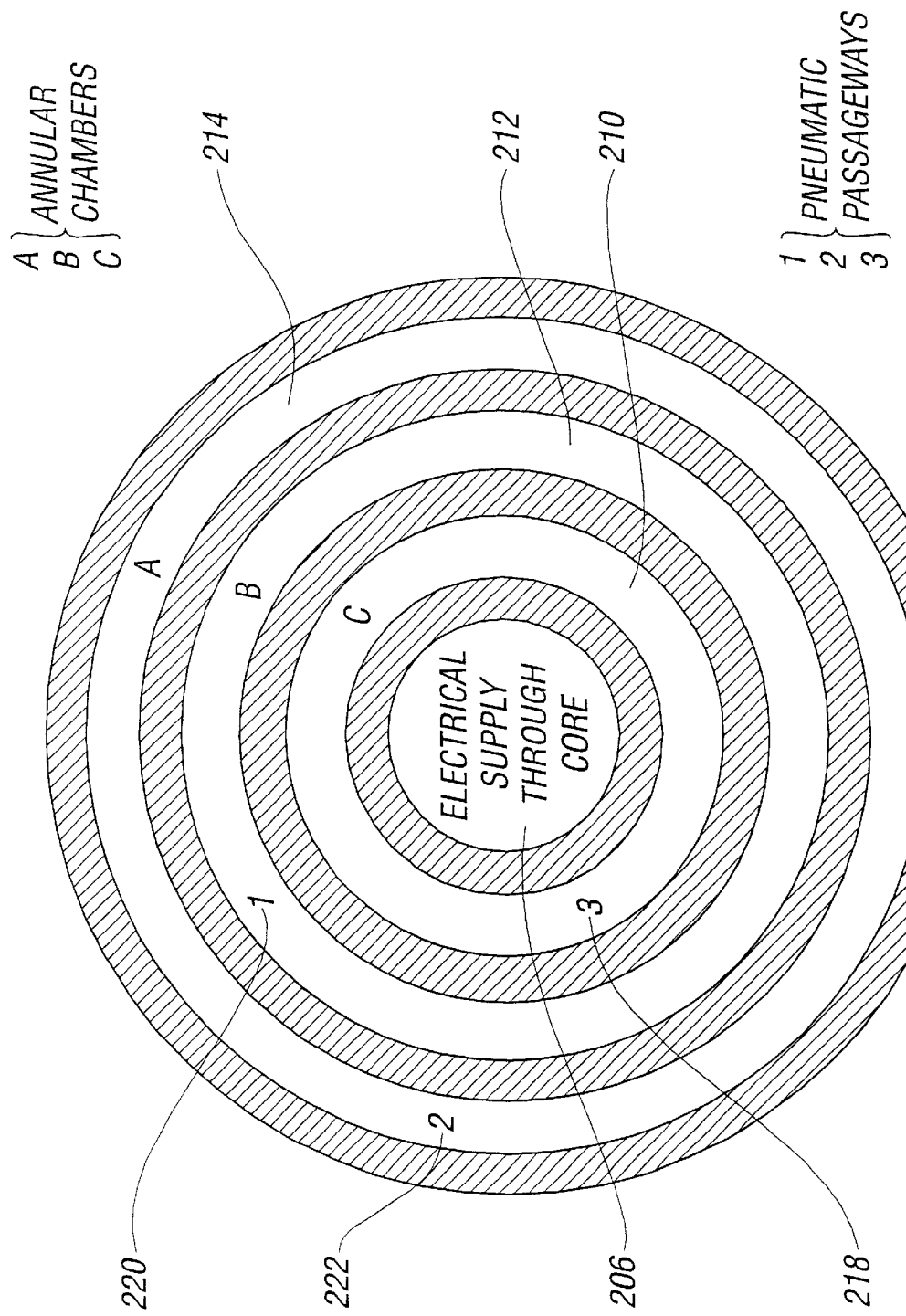

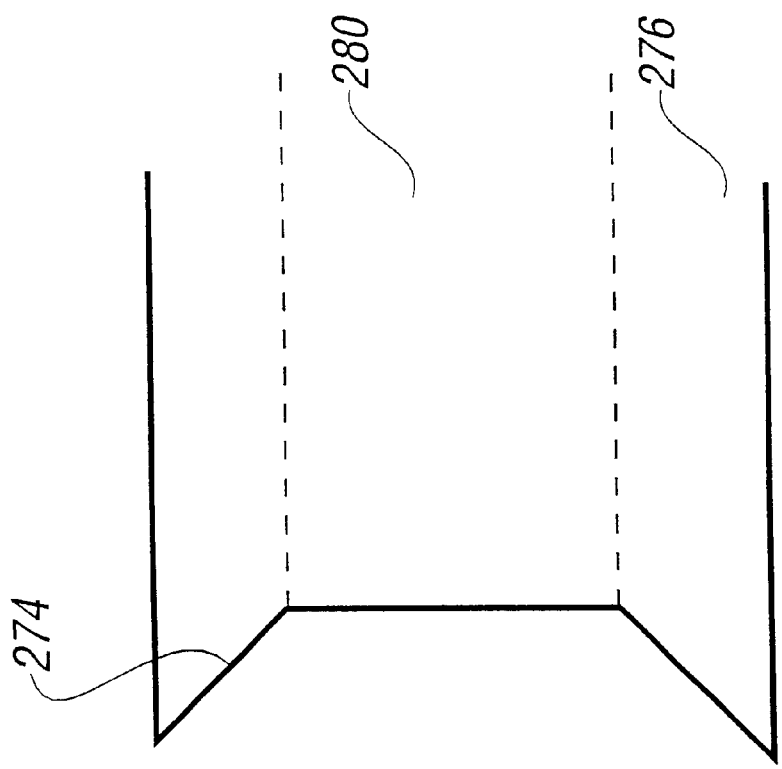
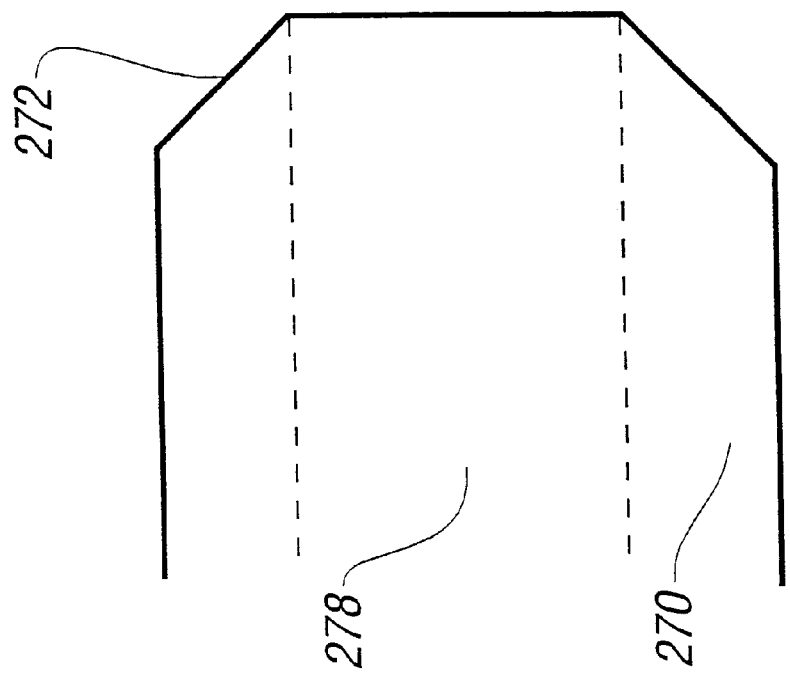
FIG. 6F

COUPLING SYSTEM AND METHOD OF USE THEREOF

This invention relates to a coupling system and method of use thereof, and particularly to a coupling system for facilitating the mechanical, electrical and/or pneumatic coupling and uncoupling between at least first and second units.

Although this application refers almost exclusively to a coupling system for a cab unit and a trailer unit of an articulated lorry, it will be appreciated by persons skilled in the art that the coupling system could be used between any two or more units where mechanical, electrical and/or pneumatic coupling and uncoupling is required. For example, the coupling system could be used between a car and caravan, tractor and trailer or the like.

A lorry typically comprises a cab and a trailer which can be mechanically coupled/uncoupled. The cab supplies the trailer with electrical and pneumatic services in order to provide the trailer with brakes, lights and other facilities.

Conventionally, cabs comprise a fifth wheel unit which provides coupling means thereon to allow coupling with coupling means, typically in the form of a kingpin, provided on a trailer. Electrical and/or pneumatic supply lines are provided on or adjacent the fifth wheel for connection with supply lines on the trailer, thereby allowing the supply of electrical and/or pneumatic services from the cab to the trailer.

The kingpin is normally coupled and uncoupled from the cab via a manual procedure, which involves the driver of the lorry leaving their cab and physically making all the necessary mechanical, electrical and/or pneumatic connections by hand. The driver has to then secure all these connections using tools to ensure that the trailer does not become mechanically disconnected or lose pneumatic and/or electrical power during travel.

A disadvantage with conventional coupling procedures is that the driver is required to leave his or her cab to perform the necessary operations, and in certain countries where coupling/uncoupling procedures occur in remote locations or at service stations, this can leave the driver vulnerable to attack and/or robbery. In addition, once the driver leaves their cab unit, they are at risk of being hit by another vehicle, particularly when the driver is required to couple/uncouple the units in a busy traffic area such as on a motorway hard shoulder. A further disadvantage of the present coupling procedure is that the parts the driver is connecting are typically covered in grease, oil and dirt and the driver often has to kneel or lie on the road surface to make the necessary connections. This inevitably results in the driver becoming dirty which is undesirable to the driver.

There are a number of safety issues associated with conventional coupling procedures which require improvement. One of the major safety problems is that the driver may not secure the coupling means between the trailer and the cab sufficiently. For example, if the coupling means are not secure, continual movement of the same caused by jolts and bumps during transit may result in accidental uncoupling.

In the event of a fire in the cab or trailer, the driver is likely to abandon the cab and trailer since uncoupling the same would take too long and thus put the driver's life in danger. If the fire then spreads, both the cab and the trailer unit, with any goods carried in the same, would be destroyed and would result in large financial loss to the company and/or insurance company.

Coupling systems have been designed to allow coupling of the cab and trailer to be operated by the driver from within the cab. These systems typically include the steps of the coupling means on the fifth wheel and the kingpin being mechanically connected prior to connection of the supply lines. Separate connection of the supply lines and mechanical coupling increases the time taken for the coupling and uncoupling procedures to be completed, thus having the same problems as mentioned above. The coupling mechanisms associated with such systems are often complicated and need a large number of components, thereby making the systems prohibitively expensive and more difficult to keep in good repair.

One known system is described in EP816211 and attempts to overcome the abovementioned problems by providing the supply lines within the cab and trailer coupling units rather than separately, thereby allowing mechanical coupling and supply line coupling to occur simultaneously. The document discloses a trailer kingpin, and a fifth wheel coupling unit on a cab having a movable part located in the coupling unit. A drive unit in the fifth wheel coupling unit drives the movable part into the kingpin to establish coupling therebetween, and is able to retract the movable part when uncoupling of the cab and trailer is required. The kingpin then rotates to allow positioning of the kingpin relative to the movable part of the fifth wheel coupling unit to complete the coupling process. Problems associated with this type of coupling system are that there are no alignment means. Due to the number of connection components in the coupling units, the components have to be cast or moulded and assembled separately and this can be time consuming and expensive. In addition, due to the fragility of the connection components and the fact that all these components are rotated during coupling, the components are susceptible to high levels of fatigue stress and are easily damaged.

The object of the present invention is to provide an improved coupling system which overcomes the abovementioned problems.

According to a first aspect of the present invention there is provided a coupling system for a vehicle for coupling at least a tractor unit to a trailer unit, said tractor unit having first coupling means which engage with complementary second coupling means on said trailer unit, said first and second coupling means having one or more service supply lines provided therein and said service supply lines of said first and second coupling means engaging upon mechanical engagement of said first and second coupling means, thereby allowing the supply of services from said tractor unit to said trailer unit and/or vice versa, and characterised in that one of said first or second coupling means is provided with one or more annular protrusions on a coupling surface and the other of said coupling means is provided with complementary annular channels on a coupling surface, said annular protrusions being received in said annular channels upon mechanical engagement of said first and second coupling means, thereby simultaneously or substantially simultaneously allowing the connection and/or communication of at least one of the tractor supply lines with at least one of the trailer supply lines to allow the supply of said service(s) therebetween.

Preferably the coupling system is capable of being operated by a driver within the tractor and/or trailer unit.

Preferably three annular protrusion and three annular channels are provided on the trailer and cab coupling units respectively.

Preferably the coupling means on the tractor and trailer are substantially vertically aligned prior to mechanical engagement/supply line connection. Thus engagement is effected between the two coupling units on a horizontal plane.

Preferably the tractor and trailer coupling means are unitary members, which allow for the mechanical connection and also electrical and/or pneumatic connection on connection of the service supply lines.

Preferably a plurality of facilities are provided on engagement of the coupling means. For example, the facilities can include operation of support legs on the first and/or second unit.

Preferably communication and/or connection of one or more pneumatic supply lines between the tractor and trailer are effected via engagement of the annular protrusions in the annular grooves/channels. The pneumatic supply lines have openings in the grooves and/or protrusions, typically one opening in each groove and one in each protrusion, which communicate on engagement of the tractor and trailer coupling means. Upon connection, air is able to flow, typically from the pneumatic supply in the tractor, around the annular grooves and into the openings on the annular protrusions to deliver air to the trailer.

Preferably sealing means, such as O-rings or other conventional sealing means can be provided in the annular grooves and/or on the annular protrusions to allow a sealed passageway to be formed on engagement of said grooves/protrusions.

The annular grooves and protrusions allow for angular freedom between the tractor and trailer units to be accommodated for during engagement and use. In addition, the annular grooves/protrusions can be integrally cast or moulded as part of the coupling means to provide strong coupling devices, typically made of steel which are not fragile like conventional coupling means.

The annular protrusions and/or channels also allow for a small degree of rotation of the first and second coupling means during normal articulation of the vehicle, i.e., about a horizontal plane, such as when the vehicle goes round corners, so that the sealed passage formed by engagement of the protrusions/channels is not broken/damaged thus allowing the first and second supply pipes connected to the passage to be in continued connection despite the rotation. The connection technique can be repeated for further supply pipes with further passages formed as required and thus the need for flexible connection hoses is avoided, as is the need for the same to be manually connected.

Further preferably the coupling means are provided in casing to protect the same from the weather.

Preferably a quick release switch is provided in the cab and/or trailer units to enable the uncoupling procedure to be carried out quickly in the event of an emergency. For example, in the event of fire in the trailer or cab, the cab can be quickly released from the trailer and driven a safe distance away from the same to ensure that the fire does not spread to the unaffected unit.

Preferably the first unit and/or the second unit is supplied with a signal box which has signalling means to indicate to a user/driver of the unit(s) that each or all of the coupling steps have been completed successfully. The signalling means can include any audio or visual signal such as one or more alarms or one or more lights.

Preferably the signal box, quick release switch and/or further control means for the coupling system are provided with a security means such that only certain personnel can operate the system. This prevents or reduces the incidence of theft of the first and/or second unit. For example, a pin number can be inserted into the security means before the signal box, quick release switch and/or further control means are made operational. The pin number can be specific to the driver, the company or can include the number plate of the first and/or second unit or the like. In addition, the security system can be connected to the vehicles starter motor such that the vehicle will not start unless the security means has been disarmed. For example, the pin number may be required before the brakes of the cab and/or trailer unit are released. This feature is likely to significantly reduce insurance premiums for users of the present invention since the risk of the vehicles being stolen is significantly reduced.

The coupling system can be retrofitted to a conventional coupling system or the tractor and/or trailer units can be fitted with new coupling means. This ensures that lorry owners do not have to replace entire fleets of vehicles in order to use the present invention. For example, both the tractor and trailer can be fitted with the coupling units or the tractor unit can be fitted with a coupling unit and can be used with both modified and unmodified trailer units.

The pneumatic hoses can be short armoured flexible hoses. Conventional flexible hoses, which are typically prone to failure, are therefore not required. However, it is envisaged that a cab unit having the present coupling system retrofitted thereto may retain the existing connectors to allow connection to conventional trailers if required.

Preferably the electrical connections communicating with the plug and socket arrangements will either retain the existing coiled cables to provide flexibility for, i.e., when a multi pin plug connector is used, or use short armoured cables for, i.e., if multiplexing or an optical connection is used.

Preferably pneumatic operation of one or more of the support legs of the trailer unit is controlled remotely from the cab unit.

Further preferably the one or more support legs are provided with a locking means to lock the support legs in an in-use position, where the legs are in contact with a floor surface, and an out-of-use position where the legs are out of contact with a floor surface.

Preferably the signalling means in the first and/or second unit indicate to a user/driver that the one or more support legs are in an in-use position or an out-of-use position.

Preferably the first and/or second coupling parts are provided with a cover mounted thereon. The cover is typically spring loaded and is mechanically displaced from the coupling part(s) during the coupling process, thereby exposing the coupling surfaces, and moves to cover the coupling part(s) during the uncoupling process.

Preferably the electrical connection between the trailer and tractor units is achieved by engagement of a plug in one of said coupling means and a complementary socket in the other of said coupling means. The electrical connection between the plug and socket can be via a plurality of electrical pins and corresponding recesses, electrical pulse signals of a multiplex system or via fibre optic means.

Preferably the second coupling means of the trailer unit is aligned above the first coupling means of the tractor unit during the coupling procedure and linearly reciprocating means are provided to raise or lower one of said coupling means between a coupled position, wherein the coupling means are engaged, and an uncoupled position wherein the coupling means are disengaged and spaced apart.

Preferably the linearly reciprocating means includes a pneumatically operated arm.

In a second aspect of the invention there is provided a vehicle having a coupling system for coupling a tractor unit to a trailer unit, said tractor unit having first coupling means which engage with complementary second coupling means on said trailer unit, said first and second coupling means having one or more service supply lines provided therein and said service supply lines of said first and second coupling means engaging upon mechanical engagement of said first and second coupling means, thereby allowing the supply of services from said tractor unit to said trailer unit and/or vice versa, and characterised in that one of said first or second coupling means is provided with one or more annular protrusions on a coupling surface and the other of said coupling means is provided with complementary annular channels on a coupling surface, said annular protrusions being received in said annular channels upon mechanical engagement of said first and second coupling means, thereby simultaneously or substantially simultaneously allowing the connection and/or communication of at least one of the tractor supply lines with at least one of the trailer supply lines to allow the supply of said service(s) therebetween.

According to a yet further aspect of the present invention there is provided a fifth wheel for a tractor unit, said fifth wheel having first coupling means which engage with complementary second coupling means on a trailer unit, said first and second coupling means having one or more service supply lines provided therein and said service supply lines of said first and second coupling means engaging upon mechanical engagement of said first and second coupling means, thereby allowing the supply of services from said tractor unit to said trailer unit and/or vice versa, and characterised in that one of said first or second coupling means is provided with one or more annular protrusions on a coupling surface and the other of said coupling means is provided with complementary annular channels on a coupling surface, said annular protrusions engaging with said annular channels upon mechanical engagement of said first and second coupling means, thereby simultaneously or substantially simultaneously allowing the connection and/or communication of at least one of the tractor supply lines with at least one of the trailer supply lines to allow the supply of said service(s) therebetween.

According to a further aspect of the present invention there is provided a method of coupling tractor and trailer units together, said method including the steps of positioning said tractor and/or trailer units relative to each other to allow alignment of first coupling means on said tractor unit with second coupling means on said trailer unit, actuating movement means on one of said coupling means to allow linear movement of said one coupling means to the other of said coupling means which is fixedly mounted to couple said means together, and characterised that one of said first or second coupling means is provided with one or more annular protrusions on a coupling surface and the other of said coupling means is provided with complementary annular channels on a coupling surface, said annular protrusions engaging with said annular channels upon mechanical engagement of said first and second coupling means, said engagement of said annular protrusions and grooves effecting connection and/or communication of at least one service supply line between said tractor and trailer units simultaneously or substantially simultaneously to the mechanical coupling of the tractor and trailer units.

Advantages of the present invention are that the driver of the cab unit or car does not have to leave their vehicle in order to actuate the coupling and locking mechanisms, thereby reducing the risk to the driver of being attacked or robbed or being hit by another vehicle whilst outside the cab. In addition, the driver avoids getting cold and wet during bad weather and ensures that their work clothes are not soiled from having to kneel or lie on the ground and actuate the coupling and locking mechanism manually. This can allow the driver to wear smarter, cleaner clothes and thus improve the public's perception of the driver, the driver's competence and the company the driver works for. The system is also easy to operate and so users of the system do not need any specialised training.

Further advantages of the present invention include the improved aerodynamic properties of the trailer and cab units by providing the service supply lines within the mechanical coupling units due to improved streamlining, which results in the fuel consumption of the vehicle being improved. The cab can be released quickly from the trailer such that the turnaround time of vehicles at ports and depots is reduced, thus making the turnaround process more efficient and saving the vehicle owner both time and money. Furthermore, since vehicles with the coupling system of the invention have safety features not present on conventional vehicles, such as electronic switching of the number plates of the second unit, insurance premiums are likely to be reduced, thereby reducing the expense to the vehicle owner. The present invention can also be retrofitted to conventional vehicles.

An embodiment of the present invention will now be described with reference to the following Figures wherein:

FIG. 3A is a simplified cross sectional view of a cab coupling unit;

FIG. 3B is a simplified cross sectional view taken along line B—B of FIG. 3A;

FIG. 6F is a simplified side view of an electrical connection according to a further embodiment of the present invention;

Referring to the figures, there is shown components of a coupling system for a vehicle having a first cab coupling unit and a second trailer coupling unit (hereinafter referred to as cab unit and trailer unit respectively).

Figure 1:
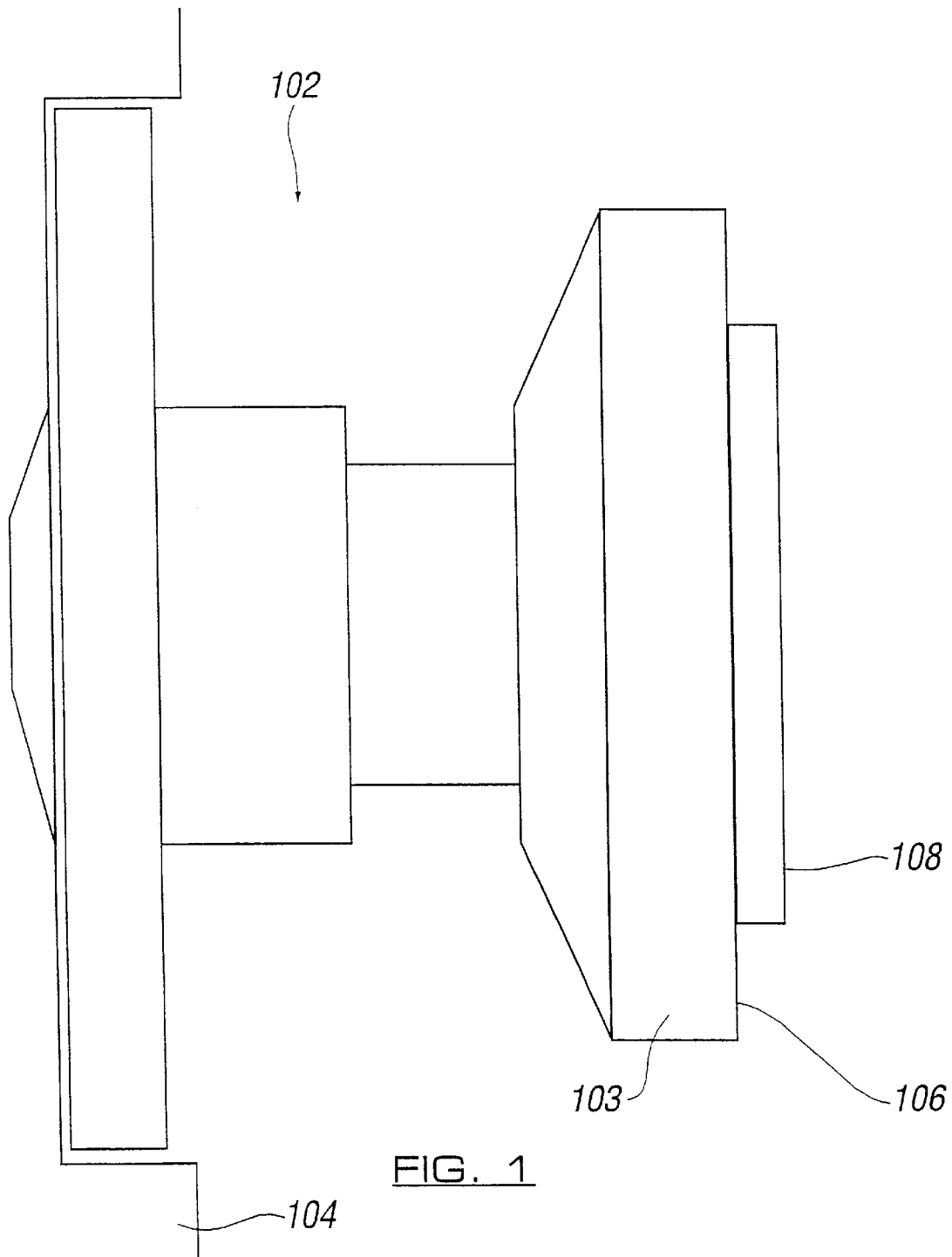
FIG. 1 is a schematic view of the external appearance of a trailer coupling unit.

FIG. 1 shows an external view of the trailer unit 102 which is fixedly mounted to a trailer 104. The trailer unit 102 is provided with a housing 103, coupling surface 106 and annular protrusion surface 108.

Figure 2:
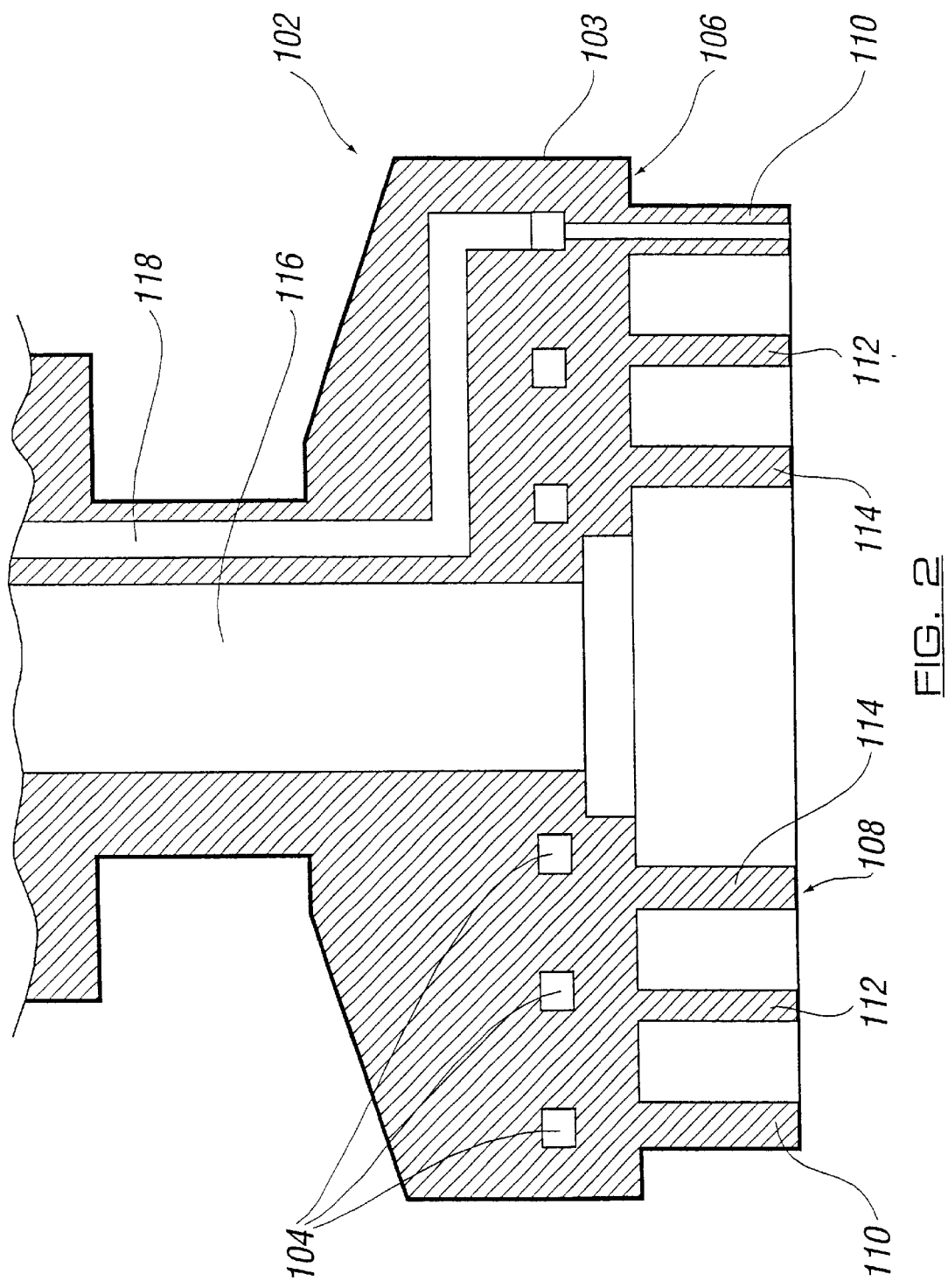
FIG. 2 is a simplified cross sectional view of the trailer coupling unit shown in FIG. 1.

FIG. 2 shows the trailer unit 102 having a centrally located electrical plug 116, a passageway 118 for the pneumatic supply and internal annular channels 104 to provide means for collecting the pneumatic supply from a number of points before supplying the trailer with pneumatic pressure. The trailer unit is also provided with annular protrusions 110, 112 and 114.

Referring to FIGS. 3A & 3B, there is illustrated a cross sectional view of a cab unit 202 comprising a housing 203, a coupling surface 204, a centrally located electrical socket 206, a pneumatic connector 208 and a pneumatic passageway 216.

The cab unit 202 is further provided with annular channels 210, 212 and 214. FIG. 2B is a cross sectional view taken along line B—B of FIG. 3 and shows the annular channels 210, 212 and 214. A pneumatic passageway opens into each annular channel, such that pneumatic passageway 216 has an opening 218 in annular channel 210, and further pneumatic passageways have openings 220 and 222 in annular channels 212 and 214 respectively. Only one pneumatic passageway has been shown in the Figures for the purposes of clarity.

It will be appreciated by persons skilled in the art that the number of annular channels and/or pneumatic passageways can be varied accordingly depending on the requirements of the cab and trailer.

Figure 4:
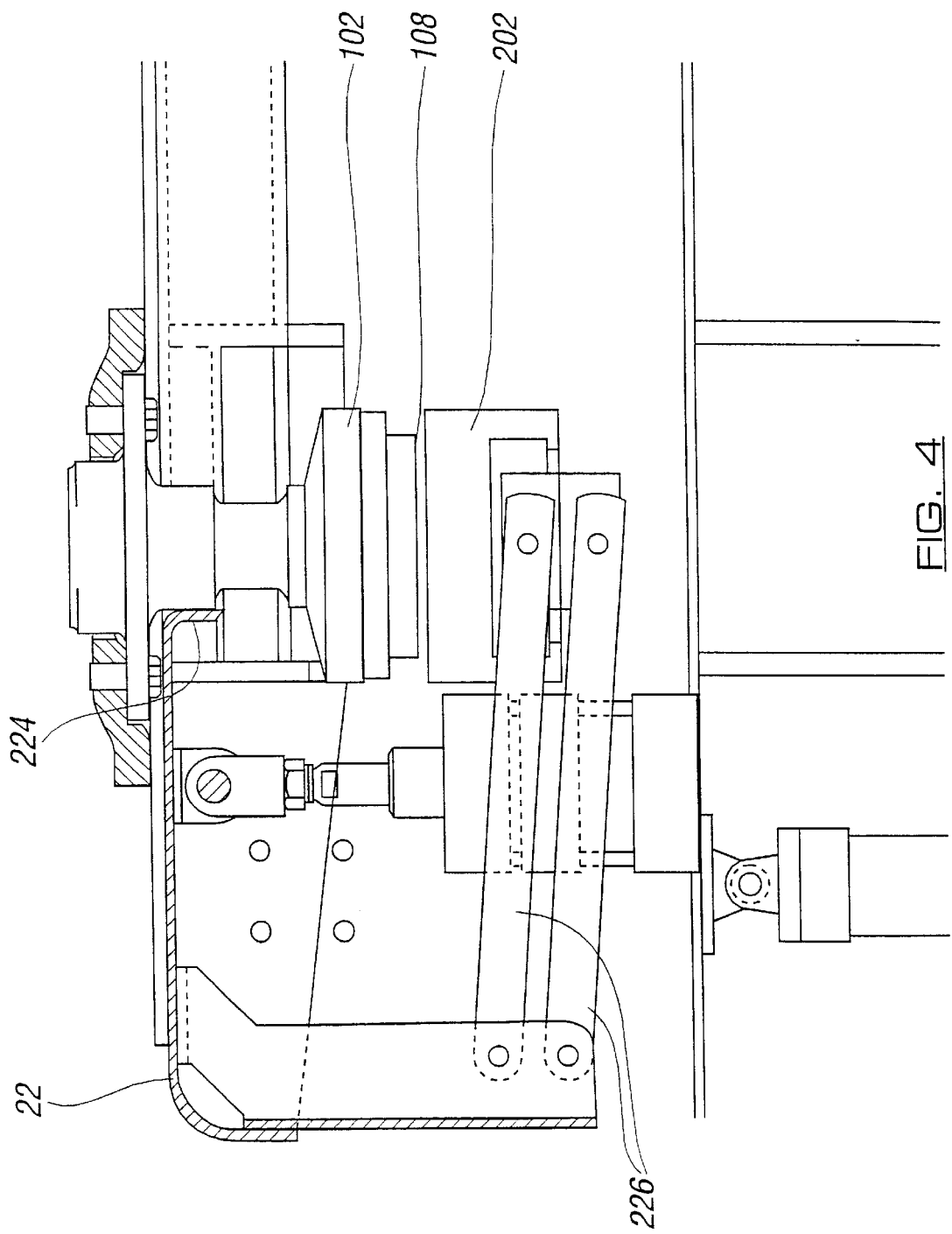
FIG. 4 is a side view of the cab and trailer coupling units when aligned prior to coupling.

During the process of coupling the trailer to the cab, the cab is reversed towards the trailer in the conventional manner until the coupling surface 204 of the cab unit 202 is aligned with the coupling surface 106 of the trailer unit 102. This alignment is realised when the trailer unit 102 contacts surface 224 on the cab units fifth wheel 225, as shown in FIG. 4. (Also shown in plan view in FIG. 5b where trailer unit 305 contacts surface 307 of fifth wheel 304).

Referring to FIG. 4, once the trailer unit 102 is in contact with surface 224 and is therefore aligned, movement means in the form of pneumatically controlled arms 226 are actuated to raise the cab unit 202 in a vertically upwardly and substantially linear direction to engage with the trailer unit 102.

As the cab unit 202 is raised, the annular protrusions 110, 112 and 114 of the trailer unit (shown in greater detail in FIG. 2), dimensioned such that they are complementary to the annular channels 210, 212, 214 (shown in greater detail in FIG. 3A) engage with said annular channels.

The annular channels are dimensioned such that they allow a small degree of misalignment between the cab and trailer units to be accommodated for.

Axial alignment between the cab unit 202 and trailer unit 102 is aided by the provision of a skirt (not shown for the purposes of clarity) provided on one of the free ends of the units around the coupling surface. The interior walls of the skirt are typically tapered to further aid this alignment and guide the other coupling unit into engagement therewith.

When engagement of the annular protrusions and channels is complete, the pneumatic services can be provided from the cab unit via passageway 218, as shown in FIG. 3, to the trailer unit. Sealing means in the form of 'O' rings are located in grooves 223 of the annular channels 210, 212, 214 such that pneumatic passageway 216 forms a continuous sealed passageway with pneumatic passageway 118 on the trailer unit upon engagement. The annular channels act to distribute and supply pneumatic pressure from the cab unit to the trailer unit.

An advantage of the annular channel and protrusion arrangement is that pneumatic supply between the units will occur at substantially all possible angular configurations of the channels relative to the protrusions, thereby requiring no further alignment mechanism between the cab and trailer units. In addition, pneumatic services can be supplied between the cab and trailer units even if the cab and trailer units are not fully aligned.

The electrical supply between the cab unit 202 and the trailer unit 102 is provided upon engagement of trailer plug 116 with cab socket 206.

Referring to FIGS. 6A–6E, there is illustrated the cab electrical socket 206 and the trailer electrical plug 116. The socket 206 has a housing 250 which is located in the cab unit 202, and the housing and socket can be rotatable relative to the cab unit.

The cab socket 206 is designed to accommodate misalignment between the socket and trailer plug of approximately +/−5 degrees, by the provision of fins 252 on socket 206.

The fins 252 are located on the exterior surface of housing 250 and engage with shaped slots 260 provided adjacent the end of trailer plug 116, thereby allowing alignment of the socket and plug prior to any electrical connection being made.

The cab socket 206 is also provided with an integral protruding flange 253 and a number of pin recesses 254 provided on engagement surface 256. An earth pin recess 258 is provided centrally of the housing 250.

As mentioned above, trailer plug 116 has shaped slots 260, which are of complementary shape to socket fins 252. A plurality of electrical pins 262 and an earth pin 263 are provided on engagement surface 265 of trailer pin. The pins 262, 263 are recessed within the plug to prevent damage to the same when the trailer is disengaged from the cab.

In use, the fins 252 on the cab socket align with slots 260 on the trailer plug. Once aligned the socket and plug are engaged and flange 253 is located in slots 260 to prevent further movement of the socket relative to the plug.

During normal articulation the electrical plug and socket connection can undergo some degree of rotation consistent with the rotation of the cab and trailer units during articulation.

Since the electrical pins are fragile, it is possible to replace the pin and socket arrangement with a multiplex system, where the cab unit supplies electrical pulses to the trailer unit. An example of such a connection is shown in FIG. 6F, where a cab electrical plug 270 is provided with a shaped end 272 for location in complementary shaped end 274 of trailer electrical socket 276. One or more cables 278, 280 or other communication means can be provided in plug 270 and socket 276 respectively to transmit the electrical pulses between the cab and trailer. Black box technology provided in or adjacent the ends of plug and/or socket allow for the processing and decoding of said electrical signals. Alternative forms of electrical connections can be provided, such as a fibre optic switching device and/or the like. This can be based on a similar plug and socket arrangement as shown in FIG. 6F. Angular misalignment between the cab and trailer unit in any of the above mentioned electrical embodiments are typically catered for by the shaped ends and do not require further alignment. In addition, the plug and socket arrangement can be significantly reduced in size compared to the electrical pin embodiment.

A signal box can be provided in the cab to allow the driver to determine the success of coupling between the trailer and the cab without actually having to leave the cab.

The signal box can provide audio and/or visual signals to the driver. For example, once electrical connection between the cab unit and trailer unit is made, a light can be lit or an alarm can be sounded to indicate to the driver that engagement of the units has taken place successfully. A series of audible or visual signals can be used for different stages of the coupling or for signalling any problems which may arise during coupling.

Figure 5A:
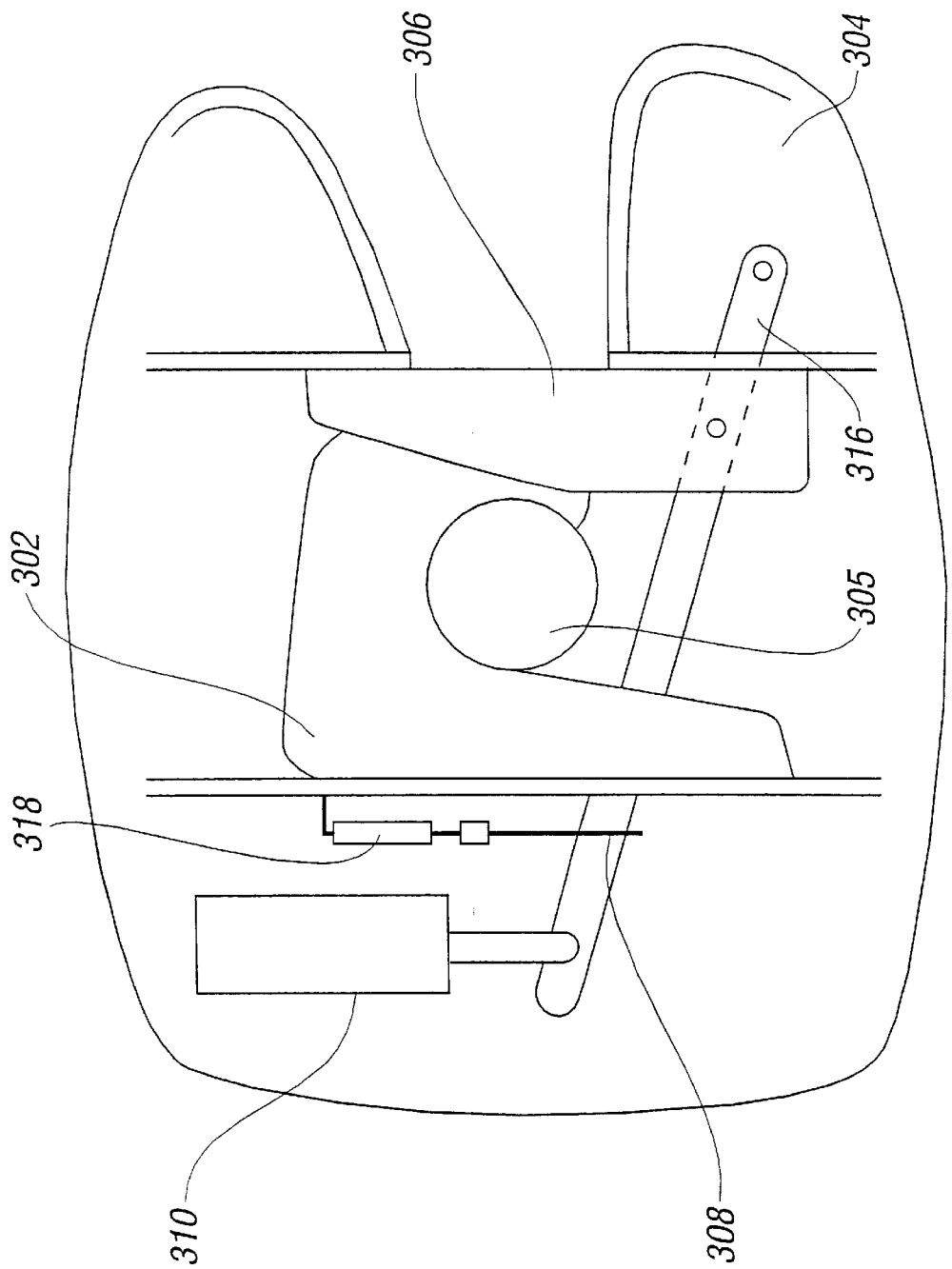
FIG. 5A is schematic representation of the primary locking mechanism in a closed position according to an embodiment of the present invention.
Figure 5B:
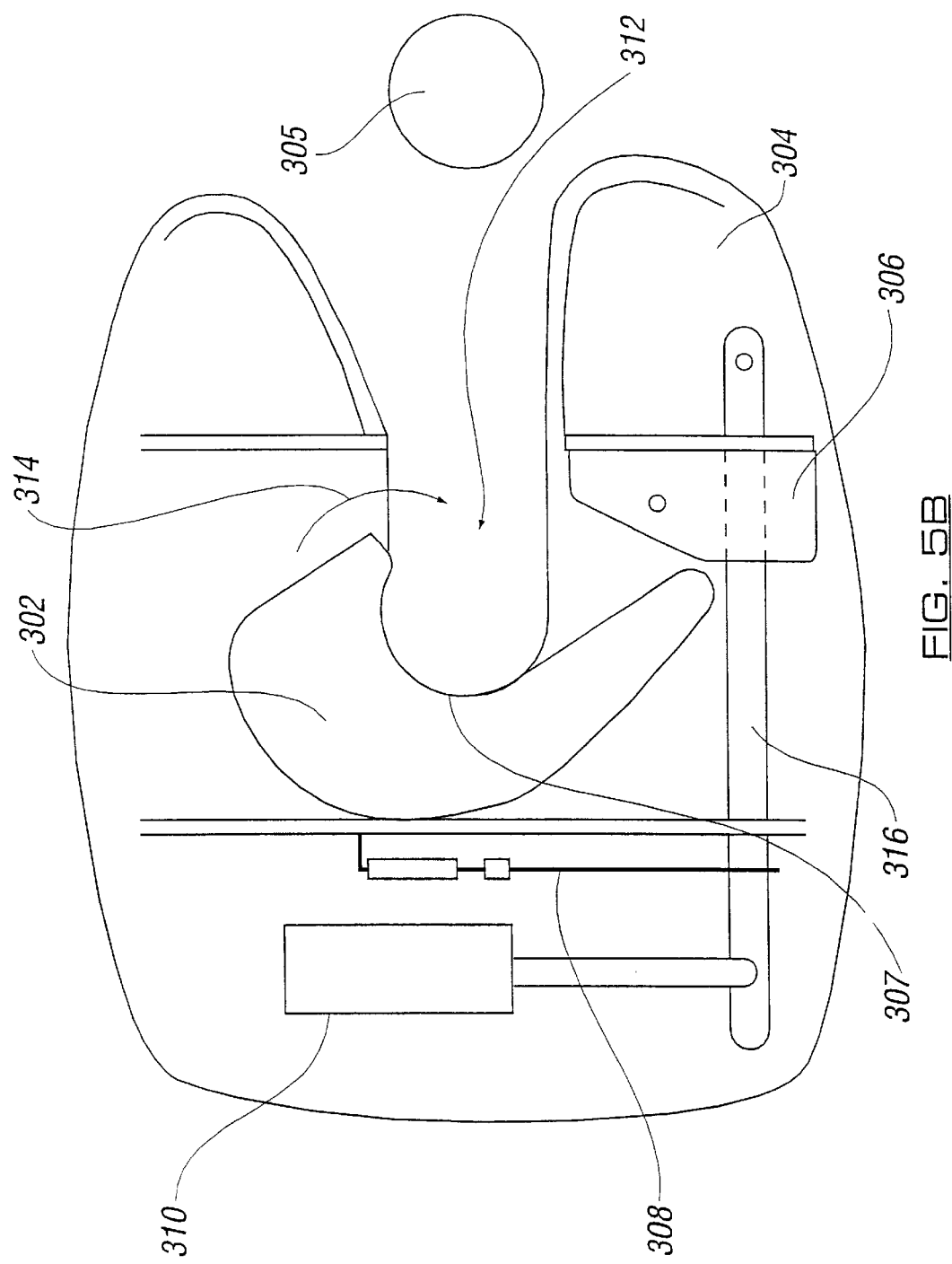
FIG. 5B is a representation of the primary locking mechanism in an open position according to an embodiment of the present invention.
Figure 6A:
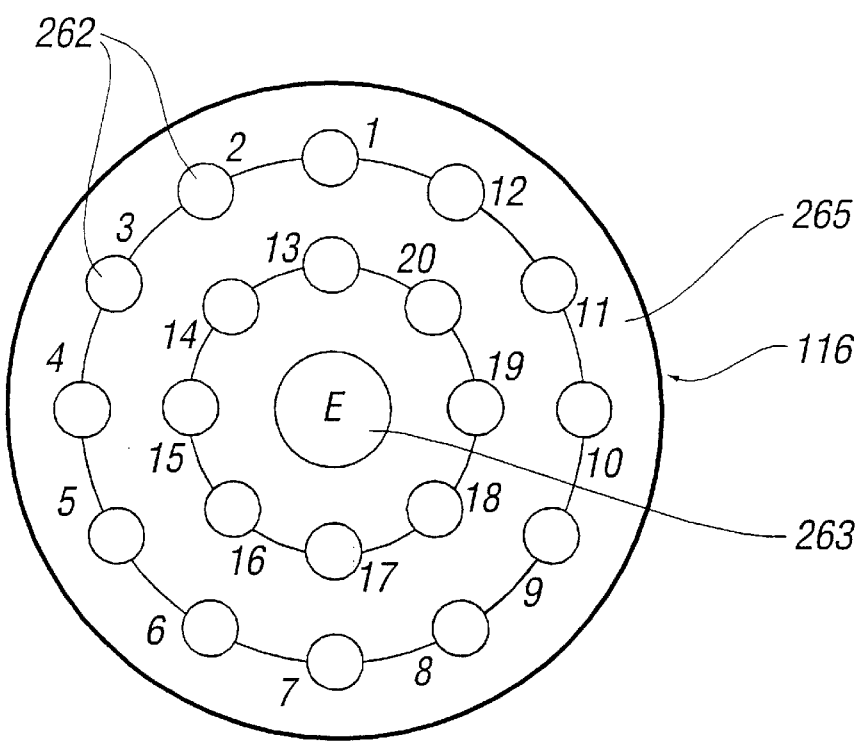
FIG. 6A is an end view of a trailer electrical plug.
Figure 6B:
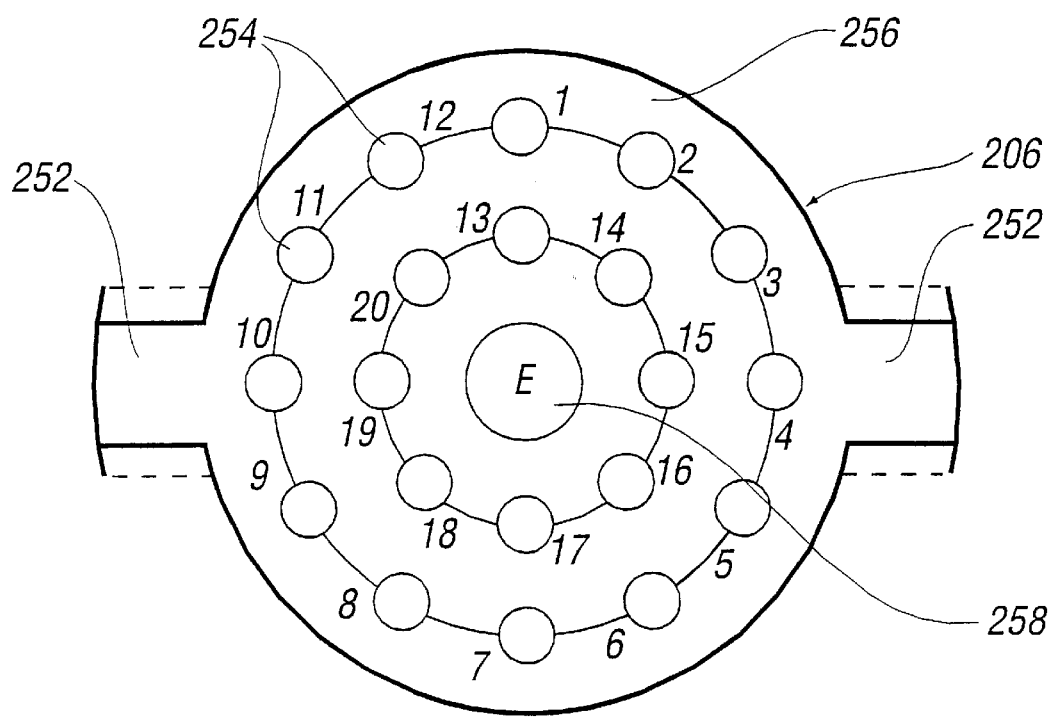
FIG. 6B is an end view of a cab electrical socket.
Figure 6C:
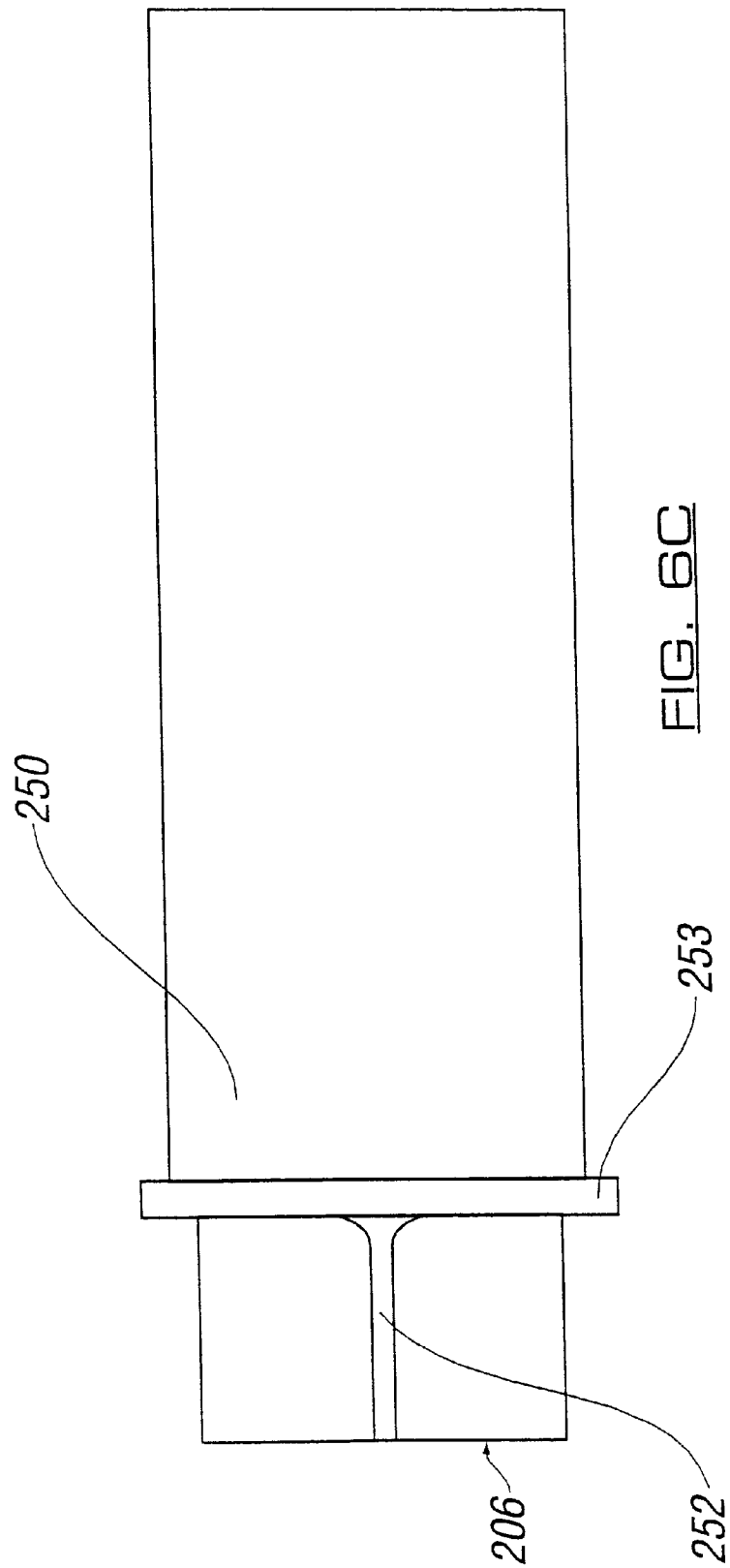
FIG. 6C is a side view of the cab electrical socket.
Figure 6D:
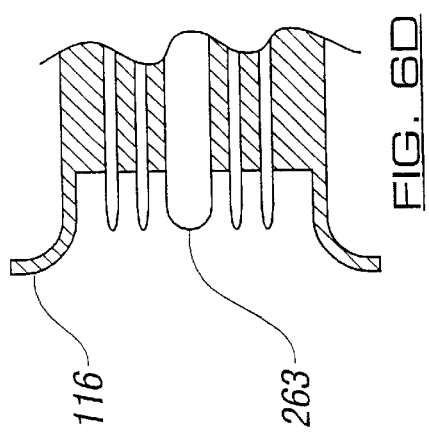
FIG. 6D is a detailed cross sectional view of the side of the trailer electrical plug.
Figure 6E:
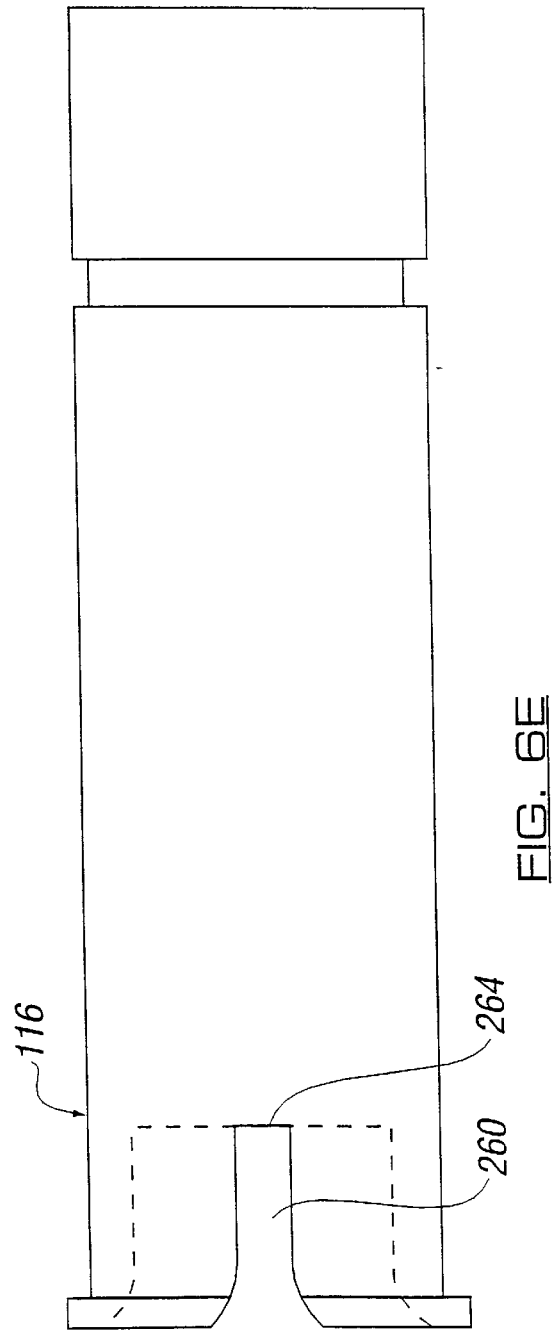
FIG. 6E is a side view of the trailer electrical plug.

Once coupling between the cab and trailer units has been made, the driver can operate a primary locking mechanism, as shown in FIGS. 5A and 5B in a closed and open position respectively. This can be actuated by the depression of an electrical switch on a control panel or on the signal box.

Alternatively, the primary locking mechanism can be actuated automatically upon engagement of the cab and trailer units.

The primary locking mechanism includes a catch 302 which is rotatably mounted on the fifth wheel 304 of the cab. The fifth wheel 304 of the cab unit has a conventional trailer coupling unit location port 312. The cab coupling unit 202 is provided beneath the location port 312 and is not shown in FIGS. 5a & 5b for clarity. Once trailer unit 305 is located in location portion 312 and makes contacts with wall 307 and the cab unit is raised into engagement with trailer unit 305, the catch 302 rotates, as shown by arrow 314, to capture the trailer unit.

The primary locking mechanism can be pneumatically operated via pneumatic cylinders 310 or operated by any other conventional means, such as manually.

A locking wedge 306 can be provided to prevent the primary locking mechanism from disconnecting in the event of pneumatic failure or accidental disconnection of the trailer unit from the cab unit when moving off following coupling of the units. The locking wedge 306 is mounted on an arm 316 also operated by pneumatic cylinders 310, and arm 316 is moved across the location port 312 to wedge the catch in an engaged position and to prevent rotation thereof. As mentioned previously, activation and/or deactivation of the locking mechanisms can be signalled to the driver via the signalling box.

A further safety locking mechanism 308 providing spring loaded engagement or other biasing means can be employed to prevent unlocking of the primary locking mechanism in the event of pneumatic failure. During the uncoupling procedure, an electrical solenoid is actuated to operate the safety locking mechanism 308 and allow retraction of the locking wedge 306.

The catch 302 and the biasing means of the safety locking mechanism 308 are typically pivoted to allow for rotation of the same. Catch 302 is operated by the action of the trailer coupling unit entering location portion 312.

During the coupling procedure, cylinder 310 has unrestricted air flow to allow movement of arm 316 and thus movement of catch 302 and locking wedge 306. Pneumatic cylinder 318 of catch 308, which can be directly or indirectly connected to arm 316 and spring biases arm 316 to a locked position, has restricted air flow. The uncoupling procedure is the reverse of the coupling procedure, with cylinder 318 of safety catch 308 having unrestricted air flow and cylinder 310, operating arm 316, having restricted air flow.

Figure 7:
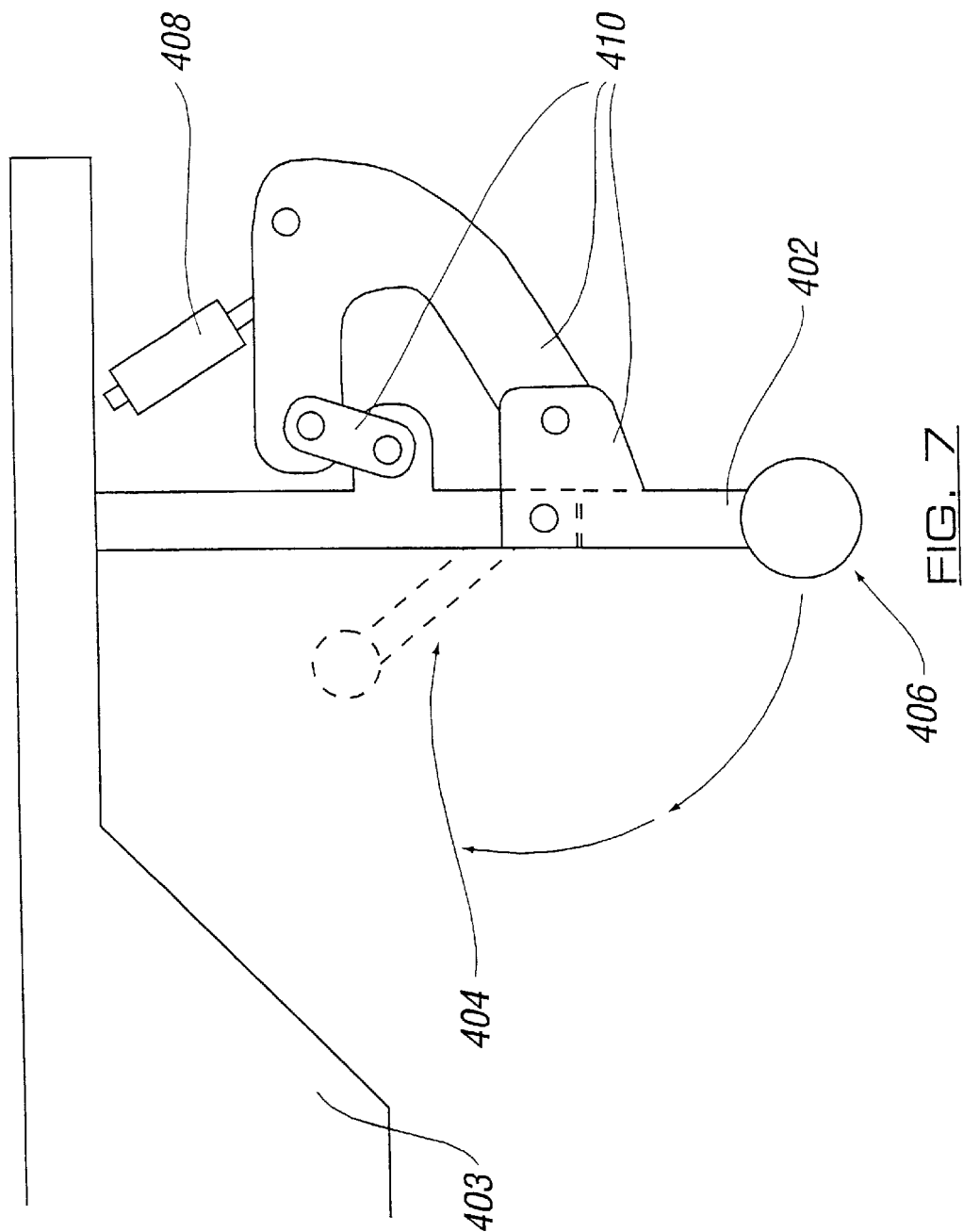
FIG. 7 is a representation of the jack system which is operable via the present invention.

Trailers are typically provided with jacks/support legs 402 to support the trailer 403 when in a parked position, as shown in FIG. 7. Once the trailer and cab are coupled together the trailer jacks can be raised (shown by dotted line 404) and lowered 406 from within the cab using the system of the present invention, power being delivered by the supply lines of the present invention. For example, the jacks can be operated via a pneumatic cylinder 408. The jack is connected and movable via a multi linkage system 410.

A quick release mechanism can be provided such that upon engagement of the cab and trailer units, the jacks rise sequentially and so the cab and trailer can be driven off almost immediately following coupling, thereby reducing the turnaround time of a lorry following loading or unloading.

Operation of the jacks from within the trailer is also important to ensure that the trailer and cab are positioned at a suitable height relative to each other, such that when the trailer is being loaded and unloaded, the coupling efficiency is maximised.

Figure 8A:
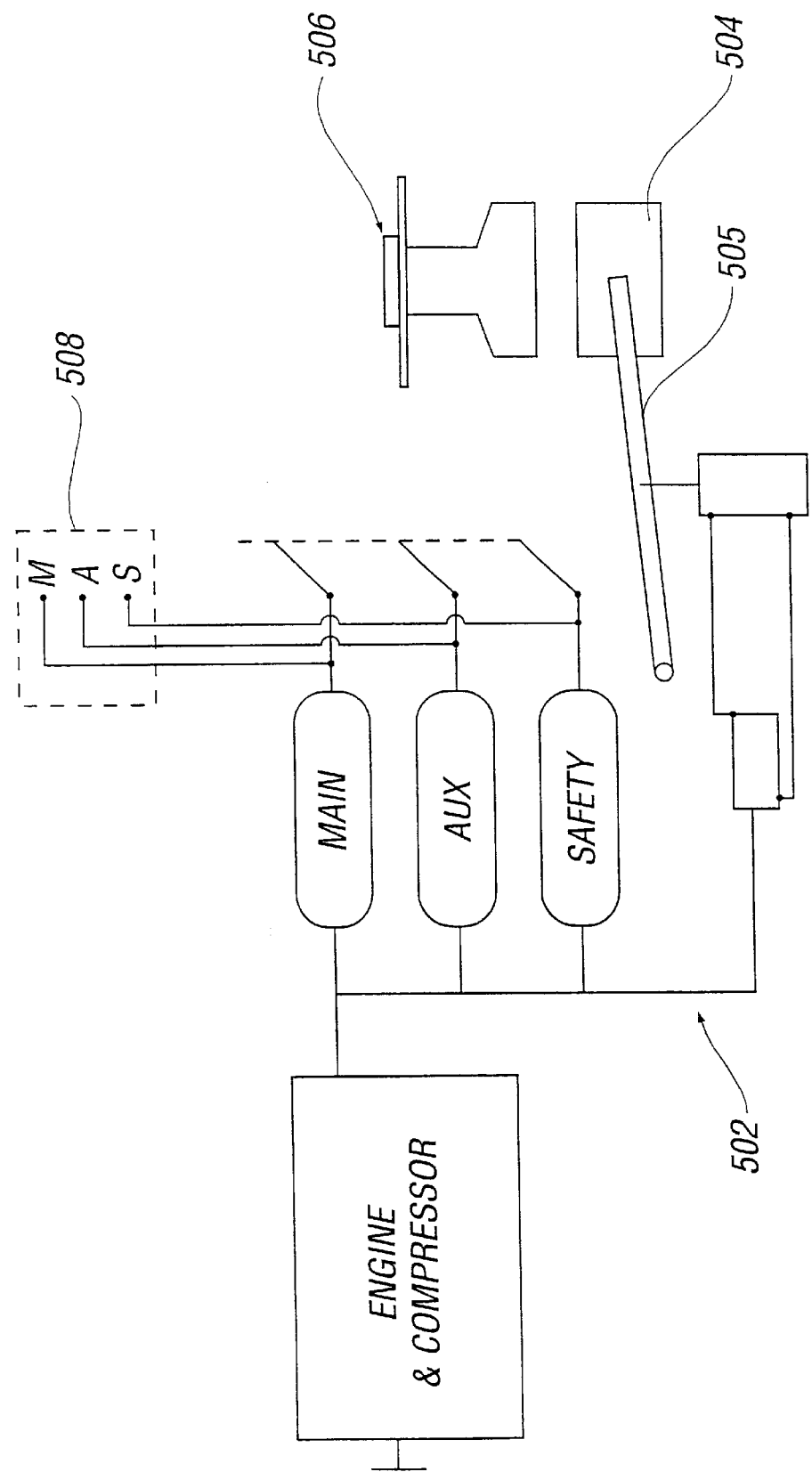
FIGS. 8A and 8B are simplified representations of the cab and trailer coupling units showing the pneumatic supply.
Figure 8B:
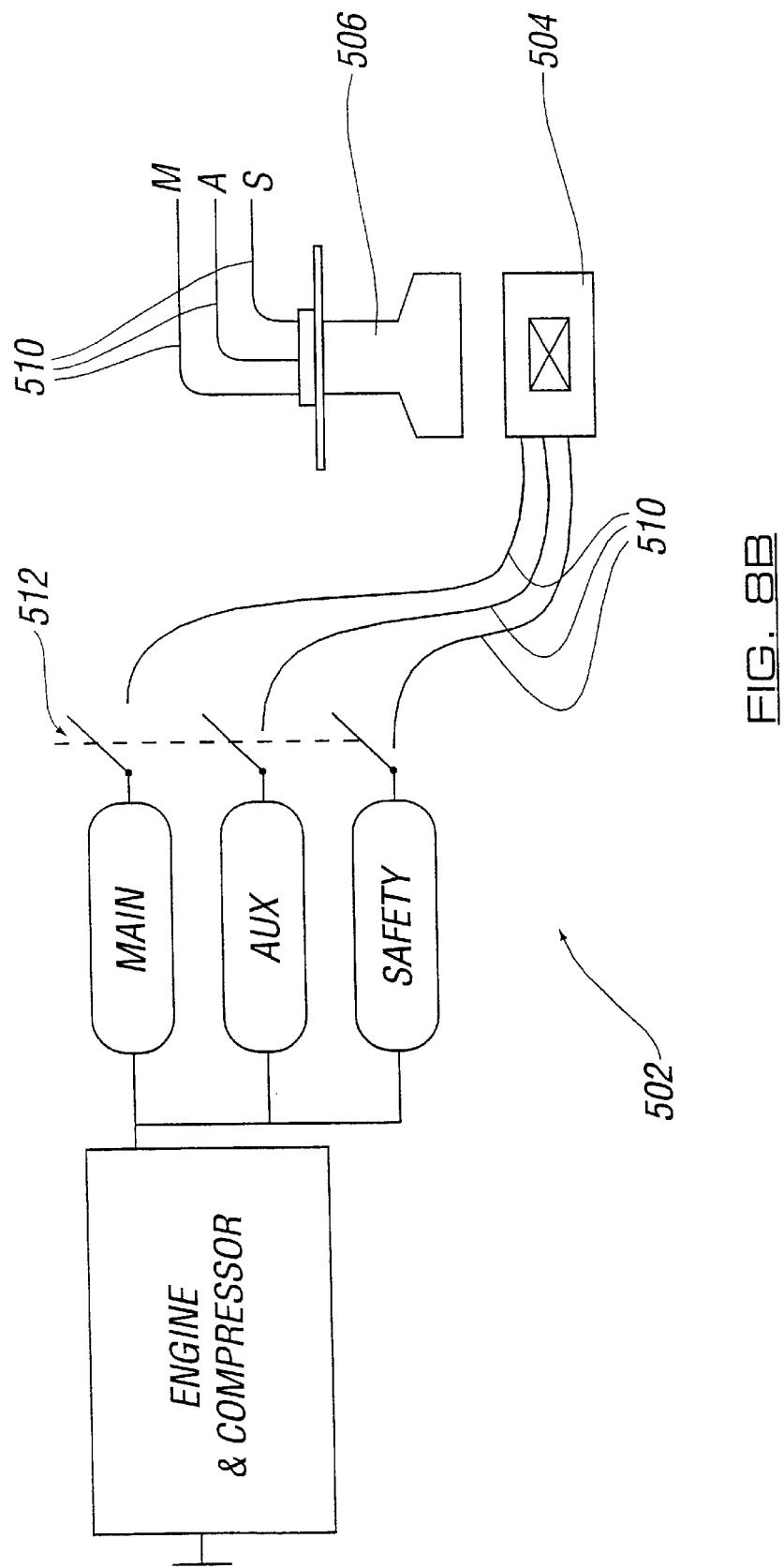

FIGS. 8A and 8B show simplified views of the pneumatic supply 502 according to an embodiment of the present invention, with the cab unit 504, and pneumatic arm 505 (shown as 226 in FIG. 4) used to allow the cab unit 504 to be raised and lowered, shown prior to engagement with the trailer unit 506. The pneumatic supply components 502 which may be used with the present invention can be retrofitted to conventional cab connectors 508 or the components can replace conventional connectors. Similarly electrical components used with the present invention can be retrofitted to conventional electrical connectors, thereby allowing a cab unit incorporating the present invention to tow a conventional trailer.

FIG. 8B shows the pneumatic valves which operate during coupling of the cab and trailer units. Closure of the isolation valves 512 upon decoupling of the cab and trailer isolate the pneumatic supply in the cab unit prior to disconnection of the pneumatic supplies between the cab and trailer units. Opening of the isolation valves during coupling actuates the pneumatic supply from the cab unit to the trailer unit.

Since the coupling efficiency is improved between the trailer and the cab using the present invention, the flexible coiled hoses typically found on conventional trailer/cab units can be removed. Short armoured flexible hoses 510 can be used to provide the pneumatic supply to the cab unit, thereby increasing the strength and durability of the same.

The trailer and/or cab coupling units can be provided with waterproof coverings to protect the same from the weather and debris which may fly up during transit.

The procedures described above can all be performed by the driver without having to leave the cab, thereby making the coupling system according to the above invention both safer and easier to use than conventional coupling methods.

What is claimed:

1. A coupling system for a vehicle for coupling at least a tractor unit to a trailer unit, said tractor unit having first coupling means which engage with complementary second coupling means on said trailer unit, said first and second coupling means having one or more service supply lines provided therein and said service supply lines of said first and second coupling means engaging upon mechanical engagement of said first and second coupling means, thereby allowing the supply of services from said tractor unit to said trailer unit and/or vice versa, and characterised in that one of said first or second coupling means is provided with one or more annular protrusions on a coupling surface and the other of said coupling means is provided with complementary annular channels on a coupling surface, said annular protrusions being received in said annular channels upon mechanical engagement of said first and second coupling means, thereby simultaneously or substantially simultaneously allowing the connection and/or communication of at least one of the tractor supply lines with at least one of the trailer supply lines to allow the supply of said service(s) therebetween.

2. A coupling system according to claim 1 characterised in that said service supply lines provide at least electrical and/or pneumatic supply between the tractor and trailer units.

3. A coupling system according to claim 1 characterised in that one or more pneumatic supply lines are connected or communicate upon receipt of the annular protrusions in the annular channels.

4. A coupling system according to claim 3 characterised in that the one or more pneumatic supply lines have openings in said annular channels and corresponding openings on said annular protrusions.

5. A coupling system according to claim 3 characterised in that sealing means are provided in said annular channels to allow a continuous sealed pneumatic passageway between said tractor unit and said trailer units to be formed on engagement of said annular protrusions/channels.

6. A coupling system according to claim 2 characterised in that the electrical connection is achieved by engagement of a centrally located plug in one of said coupling means and a complementary centrally located socket in the other of said coupling means.

7. A coupling system according to claim 6 characterised in that complementary engagement means are provided on the housings of said plug and socket to allow mechanical engagement of the plug and socket prior to, or simultaneously to electrical connection between said plug and socket.

8. A coupling system according to claim 7 characterised in that the engagement means includes one or more fin portions on the housing of one of said plug or socket which engage with one or more complementary recess/slot portions provided in the housing of the other of said plug or socket.

9. A coupling system according to claim 6 characterised in that electrical connection of said electrical plug and socket when engaged is provided by electrical pulse signals provided by a multiplex system passing between said plug and socket.

10. A coupling system according to claim 6 characterised in that electrical connection of said electrical plug and socket when engaged is provided by fibre optic means.

11. A coupling system according to claim 6 characterised in that the electrical plug includes one or more protruding pins which locate in one or more complementary pin recesses provided in said electrical socket to allow electrical connection therebetween.

12. A coupling system according to claim 1 characterised in that one of the coupling means is provided with linearly reciprocating means to allow motion between a coupled position wherein the coupling means are engaged and an uncoupled position wherein the coupling means are disengaged and spaced apart.

13. A coupling system according to claim 12 characterised in that the second coupling means of the trailer unit is aligned above the first coupling means of the tractor unit during the coupling procedure and said linearly reciprocating means raises or lowers one of said coupling means between the coupled and uncoupled positions.

14. A coupling system according to claim 12 characterised in that the linearly reciprocating means includes a pneumatically operated arm.

15. A coupling system according to claim 1 characterised in that locking means are provided to lock the first and second coupling means together when in a coupled position.

16. A coupling system according to claim 15 characterised in that the locking means include a catch provided on one or both of said units.

17. A coupling system according to claim 16 characterised in that the catch is rotatably mounted to capture the first and/or second coupling means upon mechanical engagement thereof.

18. A coupling system according to claim 16 characterised in that the catch is provided on a fifth wheel of the cab unit and captures the coupling means of said trailer unit.

19. A coupling system according to claim 1 characterised in that a quick release switch is provided in one or both of said tractor and trailer units to enable uncoupling thereof.

20. A coupling system according to claim 1 characterised in that the tractor and/or trailer unit is provided with a signal box having audio and/or visual signal means to indicate to a user/driver of the unit(s) whether coupling of the tractor and trailer units has been completed successfully and/or unsuccessfully.

21. A coupling system according to claim 20 characterised in that the signal means includes one or more audible alarms.

22. A coupling system according to claim 20 characterised in that the signal means includes on or more light sources which are switched on/off and/or change colour when coupling has been completed successfully and/or unsuccessfully.

23. A coupling system according to claim 1 characterised in that the coupling system is provided with security means to prevent unauthorised use of said coupling system.

24. A coupling system according to claim 23 characterised in that a pin number or authorisation code is required to be entered into the security means before one or more functions of the coupling system are operational.

25. A coupling system according to claim 23 characterised in that the security means is connected to the vehicle's starter motor and/or brake system.

26. A coupling system according to claim 2 characterised in that pneumatic hoses and/or electricity cables providing the pneumatic supply and/or electricity supply are short, armoured flexible hoses or cables.

27. A coupling system according to claim 2 characterised in that connection of one or more pneumatic supply lines between said trailer and tractor units allows the operation of one or more support legs on said units.

28. A coupling system according to claim 27 characterised in that the one or more support legs are provided with locking means to lock the support legs in an in-use position, where the legs are in contact with a floor surface, and an out-of-use position where the legs are out of contact with a floor surface.

29. A coupling system according to claim 20 characterised in that signalling means in the first and/or second unit indicate to a user/driver that one or more support legs are in an in-use position or an out of position.

30. A coupling system according to claim 1 characterised in that the first and/or second coupling means are provided with a cover or covers mounted over the coupling surfaces thereof.

31. A coupling system according to claim 30 characterised in that the cover(s) is/are spring loaded.

32. A vehicle having a coupling system for coupling a tractor unit to a trailer unit, said tractor unit having first coupling means which engage with complementary second coupling means on said trailer unit, said first and second coupling means having one or more service supply lines provided therein and said service supply lines of said first and second coupling means engaging upon mechanical engagement of said first and second coupling means, thereby allowing the supply of services from said tractor unit to said trailer unit and/or vice versa, and characterised in that one of said first or second coupling means is provided with one or more annular protrusions on a coupling surface and the other of said coupling means is provided with complementary annular channels on a coupling surface, said annular protrusions engaging with said annular channels upon mechanical engagement of said first and second coupling means, thereby simultaneously or substantially simultaneously allowing the connection and/or communication of at least one of the tractor supply lines with at least one of the trailer supply lines to allow the supply of said service(s) therebetween.

33. A fifth wheel for a tractor unit, said fifth wheel having first coupling means which engage with complementary second coupling means on a trailer unit, said first and second coupling means having one or more service supply lines provided therein and said service supply lines of said first and second coupling means engaging upon mechanical engagement of said first and second coupling means, thereby allowing the supply of services from said tractor unit to said trailer unit and/or vice versa, and characterised in that one of said first or second coupling means is provided with one or more annular protrusions on a coupling surface and the other of said coupling means is provided with complementary annular channels on a coupling surface, said annular protrusions engaging with said annular channels upon mechanical engagement of said first and second coupling means, thereby simultaneously or substantially simultaneously allowing the connection and/or communication of at least one of the tractor supply lines with at least one of the trailer supply lines to allow the supply of said service(s) therebetween.

34. A method of coupling tractor and trailer units together, said method including the steps of positioning said tractor and/or trailer units relative to each other to allow alignment of first coupling means on said tractor unit with second coupling means on said trailer unit, actuating movement means on one of said coupling means to allow linear movement of said one coupling means to the other of said coupling means which is fixedly mounted to couple said means together, and characterised that one of said first or second coupling means is provided with one or more annular protrusions on a coupling surface and the other of said coupling means is provided with complementary annular channels on a coupling surface, said annular protrusions engaging with said annular channels upon mechanical engagement of said first and second coupling means, said engagement of said annular protrusions and grooves affecting connection of at least one service supply line between said tractor and trailer units simultaneously or substantially simultaneously to the mechanical coupling of the tractor and trailer units.

* * * * *